May 15, 1928.
B. G. DANIS
1,670,243
APPARATUS FOR MOLDING CONCRETE FLOORS
Filed Oct. 7, 1922   3 Sheets-Sheet 1
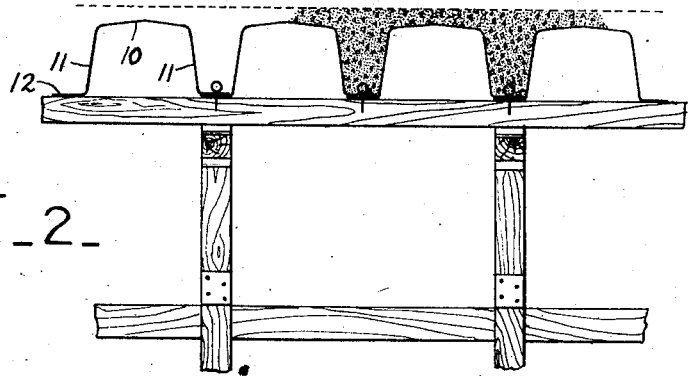
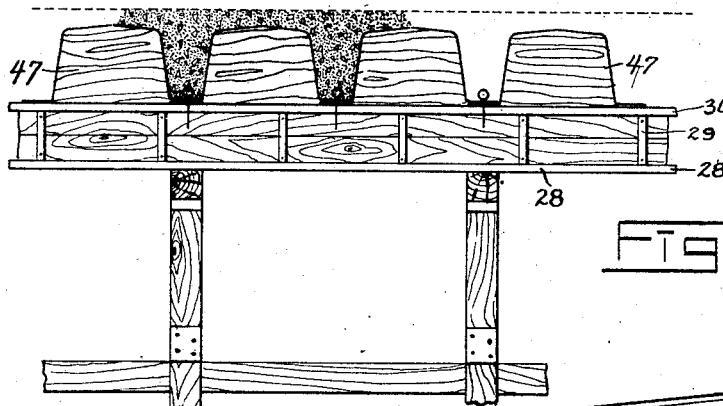
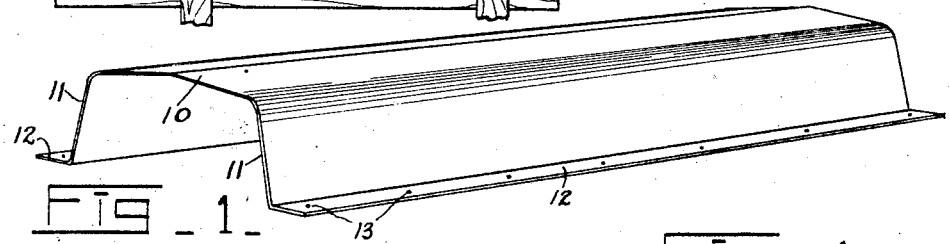
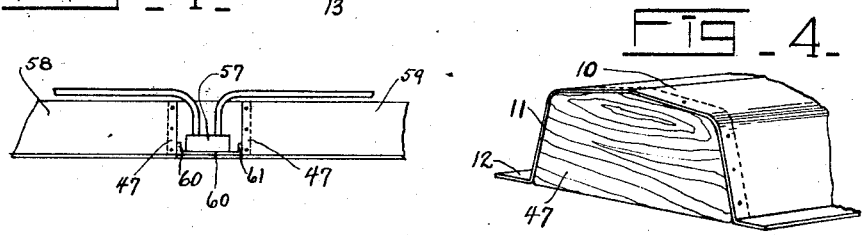
INVENTOR.
Benjamin G. Danis,
BY F. R. Fassett
ATTORNEY.

May 15, 1928.
B. G. DANIS
1,670,243
APPARATUS FOR MOLDING CONCRETE FLOORS
Filed Oct. 7, 1922  3 Sheets-Sheet 2
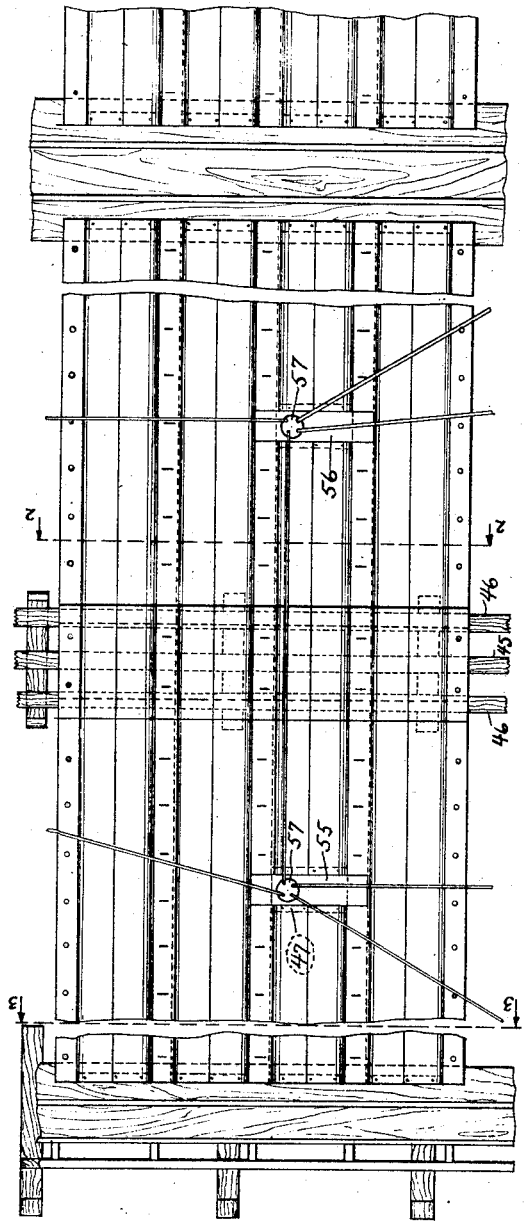
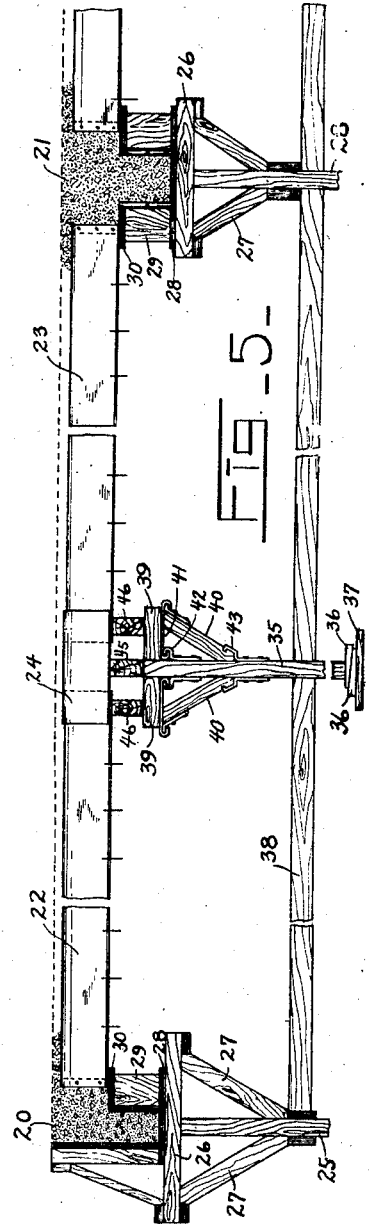
INVENTOR.
Benjamin G. Danis,
BY F. K. Fassett
ATTORNEY.

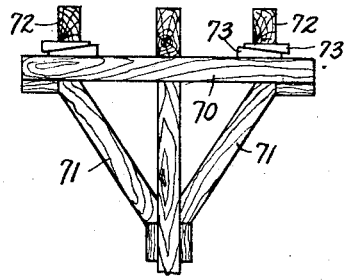 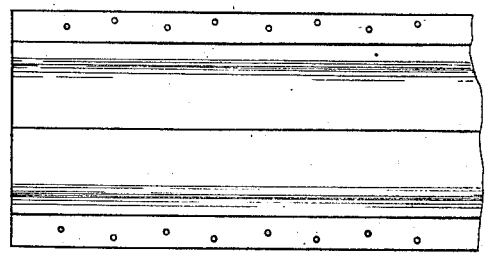
Fig. 16.   Fig. 12.
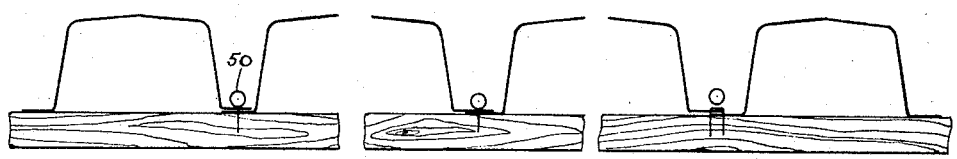
Fig. 7.   Fig. 8.   Fig. 9.
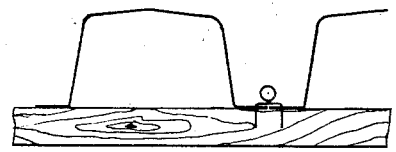 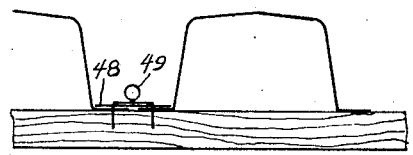
Fig. 10.   Fig. 11.
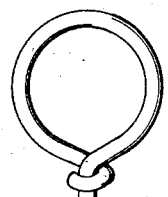 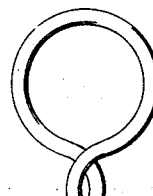
Fig. 14.   Fig. 13.
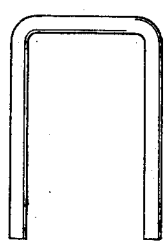
Fig. 15.

Patented May 15, 1928.

UNITED STATES PATENT OFFICE.

BENJAMIN G. DANIS, OF DAYTON, OHIO.

APPARATUS FOR MOLDING CONCRETE FLOORS.

Application filed October 7, 1922. Serial No. 593,009.

My invention relates to apparatus for molding monolithic concrete buildings, and in particular to apparatus for molding floors of the beam and joist type.

In the past it has been the practice to construct wooden forms in which to mold the concrete, which forms remained in place until the concrete had set and fully hardened. The construction of these wooden forms required large quantities of lumber and a great deal of skilled labor, practically all of which had to be duplicated for each job, and even for building the succeeding floors of the same job. The lumber was so much cut up that it was almost useless for any other purpose. Furthermore, such a large number of posts, braces, etc., was necessary for the support of these wooden forms that the space below was crowded almost to impassability. More recently, methods and apparatus have been developed in which certain standard forms were made of metal and in some cases arrangements have been made for removing some of the metal forms as soon as the concrete had set sufficiently to sustain its own weight, leaving certain portions of the forms in place to relieve the newly molded concrete of injurious strain until it had had time to fully harden, but releasing the major part of the metallic forms for immediate use elsewhere, say in the next floor above.

My invention relates to this latest type of form construction, and its principal novel feature is sheet metal forms for floors of the beam and joist type, made in sections of such length that two sections will span all but a short distance of the space between two beams, the sections being of such shape and made of metal of such thickness that they are capable of carrying the load they are required to carry although supported at their ends only. The space between these long sections is covered by short sections of similar form saddled on the apposed ends of the long sections, and a second feature of my invention is provision for supporting these middle or short sections and the apposed ends of the long or outside sections independently so that as soon as the concrete has set sufficiently to permit it the long sections can be removed, leaving the middle sections and their supports in place to support the floor until the concrete has hardened enough to permit their removal.

Another novel feature is the provision for supporting the outer ends of the long sections, where they join the beam forms, utilizing the posts which support the beam forms, but providing for the release of the floor forms without disturbing the beam supporting posts.

In all of the systems of metal form construction of which I am aware, wherein the early removal of a portion of the forms is provided for, the bottom of the joist form is separate from the other portions of the form, being a strip of wood, a steel channel, or something of the kind, which either requires separate supports or is connected by bolts, clamps, or the like to the form sections.

My floor and joist forms consist of sheets of iron or steel bent to form tops having depending sides with outwardly extending flanges at their lower edges. The sections are laid side by side with the juxtaposed flanges overlapping one another, thereby closing the bottoms of the spaces between the form sides and completing the forms for the joists. Each flange is provided with a row of apertures and the juxtaposed flanges are tied together with tying devices, consisting of stout wires bent to form forks, one tine of which is dropped into an aperture in each flange. In addition to tying the forms together and preventing their relative displacement, these tying devices perform two important functions; first, they produce a mutual re-action between the forms which greatly increases the capacity of the forms to carry their load, although supported only at their ends. That is, the amount of load the forms can carry without danger of collapsing is much increased by tying the flanges of juxtaposed forms together. Second, the heads of the tying devices, which are in the form of a loop, become embedded in the concrete and after the forms are removed the tines of the forks projecting from the lower edges of the joists are used to tie the metal laths to the ceiling. In some cases single pins are used instead of the bifurcated tying devices, as will be explained more fully presently.

Referring now to the accompanying drawings,

Figure 1 is a perspective view of a form section;

Figure 2 is a section on line 2—2 of Figure ure 6, showing several form sections assembled and supported by posts and stringers;

Figure 3 is a section on line 3—3 of Figure 6, showing the ends of the form members supported on portions of the beam form;

Figure 4 shows a portion of a form section with its end closed with a wooden header. The ends of the forms in Fig. 3 are thus closed;

Figure 4A is a detail showing the method of forming a pocket to receive an electric-conduit junction box;

Figure 5 is an elevational view, showing two beams in section and the manner of bridging the distance between the beams with two long form sections and a short section saddled on the apposed ends of the other two sections;

Figure 6 is a plan view of the parts shown in Figure 3;

Figures 7 to 11, inclusive, show various ways of assembling the form members, so as to form joists of different widths;

Figure 12, is a plan view of a form having two rows of apertures in the flanges;

Figure 13 shows a tying device, and

Figure 14 shows a pin used for tying the flanges together where the apertures can be brought into registration and the single pin put through the apertures in two flanges;

Figure 15 shows a modified form of tying device;

Figure 16 shows a modified arrangement for supporting the forms.

While the forms might be made with flat tops and vertical sides, I prefer to make the tops 10 slightly ridged; it stiffens the form. Instead of making the sides 11 vertical they flare outward. This has the double advantage of thickening the upper part of the joist, which carries the greatest strain, and it makes the forms nest closely when they are being stored or transported. The flanges 12 extend horizontally from the sides and are provided with apertures 13.

Referring now more particularly to Figs. 5 and 6, I shall describe my novel method of supporting the forms and providing for the removal of all but the middle sections as soon as the concrete has set sufficiently to permit it. The space between beams 20 and 21 is spanned by two long form sections, 22 and 23, and the short section 24. The form for the beam 20 is built of wood and supported on a line of posts 25. Each post carries a cross piece or cap 26 at its top, which is additionally supported by braces 27. The only portion of this form that it is necessary to particularly describe is that which contributes to the support of the outer ends of the long form sections. This consists of a plate 28 resting on the arms of the caps 26 and carries a plurality of short blocks of wood, 29, on the upper end of which lies another plate 30. See Figure 3. The blocks 29 are lightly toe-nailed to the two plates, so that when the time comes for removing the form members the blocks can be easily knocked out and the plate 30 removed. The blocks 29 also serve as supports for one of the vertical walls of the beam form. The construction of the form for beam 21 is the same as that for beam 20, except that being an intermediate beam both sides are constructed in the manner described.

For the support of the inner ends of the form members, I provide a line of posts 35, placed midway, preferably, between the two beams. These posts stand on wedges 36 placed on a sill 37. The posts are braced by tie planks 38 extending to the posts 28. Each post 35 is provided with two arms 39 extending laterally from each side of its upper end, these arms and their braces 40 being secured to the posts by interlocking devices, which prevent their separation by other means than lateral movement with reference to each other. A metal plate 41 is secured to the under side of the arm, the ends of the plate being folded back to form hooks. A metal hook 42 secured to the post a proper distance from its upper end, engages the hook at the inner end of the plate 41. The upper end of the brace 40 is provided with a metal plate with its end bent outwardly to engage the hook at the outer end of the plate 41, and at its lower end the brace is supported by a metal bracket 43 whose upper end is bent inward to engage in a transverse slot cut in the brace. These metal parts are preferably as wide as the posts, and upon inspection of the drawing it will be seen that the arm and brace is secured to the post in a very secure manner, and that the arm and brace can only be removed from the post by knocking them sidewise.

The posts carry three stringers, a center one 45, which rests on the ends of the posts, and on each side a stringer 46, resting the removable arms 39. Leaving the tops of the posts entirely free from the arms is an advantage, as it enables the arms to be removed without disturbing the stringer 45. The arms 39 might be dispensed with and the plates 41 placed high enough so the stringers could rest on them, but the wooden arms make the structure more rigid.

The form sections 22 are set with one end resting on the plate 30 and the other end on the nearest sill 46, and the sections are short enough so that when the arm 39 is removed, after the concrete has set, the form can be pulled down without disturbing the posts or sill 45 or interference from them. In like manner the form sections 23 are put in place, and the short intervening space is covered by sections 24, which are saddled on the apposed ends of the sections 22 and 23. These short sections are allowed to rest on the other sections, but they also rest on the sill 45, so that removal of the sills 46 and the long forms will not disturb the newly formed floor, the posts, the sill 45 and middle sections of the forms remaining to carry the load until the concrete has hardened. Because of their being well supported and being short, the middle forms may be made of thinner metal than the long forms. Otherwise they are the same as the long forms. The outer or beam ends of the form sections are closed by wooden headers 47, which are fitted into the forms and fastened with nails driven through holes in the form into the wood. Thus it is seen that when the beam forms and the spaces between the form sections are filled with concrete, and the concrete is raised to a level of several inches above the tops 10 of the forms, a monolithic floor is formed consisting of a slab supported by joists which join beams at each end.

The advantages of tying the form flanges together have been pointed out. Figures 7 to 11, inclusive, illustrate various embodiments of this tying feature, and in Figure 9 is seen the embodiment previously referred to. While specific dimensions form no part of my invention, for convenience a few hypothetical dimensions will be used here. Suppose the flanges 12 were three inches wide, with the apertures 13 one inch from the edge of the flange. In Figure 9, where the flanges overlap one inch, the joist will be five inches thick at the bottom. Placing the flanges edge to edge, as in Figure 10, would make a joist six inches thick, and Fig. 11 shows how in a special case a joist can be made any thickness above six inches, by separating the flanges and covering the gap with a plate 48, the plate and flanges being tied together with the tying device 49. These bifurcated tying devices may be made of various widths, but for most cases the size used in Figure 9, that is, one inch wide, will be used. In Figure 8 the flanges lap two inches, bringing the aperture into registration, and the tying device 50 is a single pin, making the thickness of the joist four inches. In Figure 7 the flanges are three inches wide and the apertures in the middle of the flange. Being tied with the single pin 50, the thickness of the joist is three inches. This is the arrangement which is shown in Figure 6. In Figure 12 is shown a form having two rows of apertures in the flanges, one row one inch from the edge and the other one and one-half inches from the edge. From the foregoing it is seen that my improved forms can be used in a variety of conditions and that with respect to the thickness of the joist which they will form they are very flexible.

As previously stated, the tying devices are designed to be embedded in the concrete, to be used later for tying the laths to the ceiling. For this purpose the simple loop or eye shown in Figures 13 and 14 is very satisfactory. In some cases, however, the ceiling is not to be lathed and then to avoid having the wire left in the joist, an ordinary wire nail can be used in place of the single pin 50, or the staple shown in Figure 15 in place of the bifurcated device 49. Either of these would come down with the forms.

At 55 and 56, Figure 6, are shown pockets for electric-conduit junction boxes 57, an elevational view of one pocket being shown in Figure 4A. The pocket is formed by using two short sections, placed with a space between them, the ends abutting the space being closed with wooden headers 47. The bottom of the space is closed by a metal plate 60 having upturned flanges 61 at its side edges, which lie against the headers 47. The ends of this plate rest on the flanges of neighboring forms. The junction box rests on the plate and it, together with the conduits leading to it, are embedded in the concrete with which the pocket is filled.

In lieu of the posts with removable arms shown in Figure 6, a post having a fixed head 70 may be used, as in Figure 16, the head being further supported by braces 71 and carrying side sills 72. To provide for releasing these sills they are set on pairs of wedges 73.

It is not essential that the middle forms be just midway between two beams, although if it can be done without inconvenience it is preferable. The forms are made in lengths such that two lengths will lack from six to twelve inches of spanning the distance between two beams. Suppose the distance is twenty-one feet; two ten foot forms would be used, and connected by a two foot middle section, allowing for overlapping six inches at each end of the middle section. In case the span is too long to permit of the early removal of the forms, leaving the floor supported by a single line of posts, three long forms may be used, with two middle sections and two lines of posts. I have referred only to beams forming the boundaries of the space to be spanned by my form construction, but is is to be understood that the term "beam" may mean wall. That is, the forms may connect to forms for a concrete wall at one or both sides of the span.

It will now be seen that my system of form building is much more simple than any previously devised. The forms being mere sheets of iron bent to the required shape, are made of metal thick enough to enable them to carry their load, although supported at their ends only. And yet it is not necessary to use very thick metal; number 16 gauge has been found sufficiently strong for forms as long as it is practical to make them, that is, ten or twelve feet long. And be it understood that any limitations in this respect are imposed by the partially hardened concrete, depending upon its capacity for self-support. The forms can be made in sections as long as the unsupported span of concrete will permit. The forms are therefore light, and since there is no heavy auxiliary apparatus, such as steel beams, channels, or the like, liable to fall on the workmen when the form supports are removed, the work of removing the forms is much simplified. Furthermore, it is unnecessary to get up to the under side of the forms in erecting them, as after the posts and stringers are in place all of the work of placing the forms and tying them together is done from above. Then in taking the forms down it is not necessary to get to any part of the under side except to remove the stringers and the plate.

After that is done all that is needed is to pull the forms loose from the concrete. It is evident, therefore, that my improved system is very economical in the matter of labor as well as in the quantity of lumber required.

I claim:

1. In apparatus for molding concrete floors, sheet metal forms comprising tops with depending sides having outwardly extending flanges at their lower edges, said forms being assembled in a plurality of juxtaposed series of three forms set end to end with the middle section, which is relatively short, saddled on the apposed ends of the other two, tying devices comprising pins inserted in apertures in the juxtaposed flanges, whereby the flanges are tied together, said devices having heads which become embedded in the concrete to serve later as supports for laths; means for supporting said middle forms, and supports for the ends of the outside forms, said supports being removable after the concrete has been poured, without disturbing the middle supports, the long forms being made of metal of sufficient thickness to enable them to carry their load though supported at their ends only.

2. In apparatus for molding concrete floors, sheet metal forms comprising tops with depending sides having outwardly extending flanges at their lower edges, said forms being assembled in a plurality of juxtaposed series comprising three longitudinally alined forms, the middle one being relatively short and saddled on the apposed ends of the other two; a row of posts carrying a stringer on which said middle forms but none of the others rest, brackets removably attached to said posts, one at each side of said stringer, and stringers carried by said brackets, one on each side of the first mentioned stringer, said side stringers supporting the ends of the outside forms; a beam form to which the forms at one side are connected, so that the beam, floor slab and joists will be monolithic, said beam form comprising a plate of sufficient width to serve as a bottom for the form and afford a ledge on which to rest the ends of the floor forms, said plate being carried by short vertical blocks which in turn stand on another plate, said blocks being arranged to be knocked out of place after the concrete has set, thereby releasing the upper plate and the floor forms.

3. In apparatus for molding concrete floors, sheet metal forms comprising tops with depending sides having outwardly extending flanges at their lower edges, said forms being assembled in a plurality of juxtaposed series of three forms set end to end with the middle section, which is relatively short, saddled on the apposed ends of the other two; means for supporting said middle forms, supports for the other forms at their ends, said supports being removable without disturbing the middle forms or their support, and means for tying the juxtaposed flanges together, whereby a mutual reaction is established between said depending sides, increasing the load-carrying capacity of the forms when supported at their ends only.

4. In apparatus for molding concrete floors, sheet metal forms comprising tops with depending sides having outwardly extending flanges at their lower edges, said forms being assembled in a plurality of juxtaposed series of three forms set end to end with the middle section, which is relatively short, saddled on the apposed ends of the other two; means for supporting said middle forms, supports for the other forms at their ends, said supports being removable without disturbing the middle forms or their support, and tying devices comprising pins inserted in apertures in the juxtaposed flanges, whereby the flanges are tied together, thereby producing a mutual reaction between the flanges and form sides and increasing the load-carrying capacity of the forms when supported at their ends only.

5. In apparatus for molding concrete floors, sheet metal forms comprising tops with depending sides having outwardly extending flanges at their lower edges, each flange being provided with a series of apertures so located that the apertures in overlapping flanges of juxtaposed forms may be placed in registration, and pins in said apertures to tie the flanges together, whereby rigidity is given to said depending sides, better enabling the forms to carry their load, although supported at their ends only.

6. In apparatus for molding concrete floors, sheet metal forms comprising tops with depending sides having outwardly extending flanges at their lower edges, each flange being provided with a series of apertures so located that the flanges of juxtaposed forms may be tied together with tying devices comprising pins to be inserted in said apertures, and tying devices in said apertures whereby a mutual reaction is established between said depending sides, increasing the rigidity of the forms and better enabling them to carry their load although supported at their ends only.

7. A support for concrete forms comprising a post, an arm projecting laterally therefrom and a brace for the outer end of the arm; said arm and brace being secured to the post and to each other by interlocking devices which prevent their separation by other means than lateral movement with reference to one another.

8. In apparatus for molding concrete floors, sheet metal forms comprising tops with depending sides having outwardly extending horizontal flanges at their lower edges, each flange having apertures so located that the apertures in over-lapping flanges of adjacent forms may be placed in registration, and pins to be inserted from above to tie the flanges together, said pins having heads adapted to become embedded in the concrete molded on the forms.

9. Apparatus for molding a monolithic floor comprising a slab supported by beams on two sides, with joists extending from one beam to the other; said apparatus comprising sheet metal forms having tops, depending sides, and flanges extending outwardly from the lower edges of said sides, the forms being assembled into a plurality of series of forms placed end to end, and the several series placed side by side with their juxtaposed flanges forming bottoms for the spaces between the forms, in which the joists are molded, said series of forms being long enough to span the distance from one beam to the other and consisting of one short middle section and two long end sections; means for tying the juxtaposed flanges together and means for supporting said forms, comprising stringers extending transversely under two or more series of forms, upon which said flanges of the forms rest, one of said stringers supporting only the middle forms, a second stringer supporting the inner ends of the long forms on one side of the middle section, and a third stringer supporting the inner ends of the long forms on the other side of said middle forms; means for supporting the outer ends of said end forms, which means with the stringers supporting said inner ends constitute the sole support for said long forms, and means whereby said second and third stringers may be removed without disturbing the first.

10. A false-work to use in molding a monolithic floor, comprising a plurality of forms, each consisting of a top and depending sides having flanges extending horizontally outward from their lower edges, said forms lying side by side with their flanges juxtaposed, and means applicable from above for securing said flanges together.

11. A false-work to use in molding a monolithic floor, comprising a plurality of sheet metal forms placed side by side, each form consisting of a top and depending sides having flanges extending horizontally outward from their lower edges, thereby enabling the flanges of adjacent forms to lie edge to edge or to overlap, and means for securing the edges together.

12. A false-work to use in molding a monolithic floor, comprising a plurality of sheet metal forms, each consisting of a top and two depending sides having flanges extending horizontally outward from their lower edges, said forms lying side by side with said flanges juxtaposed, and means for securing the flanges together, said means being of such character that when the forms are removed a portion of said means remains embedded in the concrete, the remainder being adapted to secure lath to the ceiling.

BENJAMIN G. DANIS.